US010714105B2

(12) United States Patent
Han et al.

(10) Patent No.: US 10,714,105 B2
(45) **Date of Patent: *Jul. 14, 2020**

(54) AUDIO FINGERPRINTING

(71) Applicant: Gracenote, Inc., Emeryville, CA (US)

(72) Inventors: Jinyu Han, Emeryville, CA (US); Robert Coover, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,113

(22) Filed: Feb. 7, 2019

(65) Prior Publication Data

US 2019/0244624 A1 Aug. 8, 2019

Related U.S. Application Data

(63) Continuation of application No. 15/008,042, filed on Jan. 27, 2016, now Pat. No. 10,229,689, which is a continuation of application No. 14/107,923, filed on Dec. 16, 2013, now Pat. No. 9,286,902.

(51) Int. Cl.
*G06F 17/00* (2019.01)
*G10L 19/018* (2013.01)

(52) U.S. Cl.
CPC .................................. *G10L 19/018* (2013.01)

(58) Field of Classification Search
CPC ..................................................... G10L 19/018
USPC ............................................................ 700/94
See application file for complete search history.

(56) References Cited

U.S. PATENT DOCUMENTS 7,082,106 B2 7/2006 Sharma et al.
8,158,870 B2 * 4/2012 Lyon .................... G10H 1/0008 84/609
8,165,414 B1 4/2012 Yagnik
8,411,977 B1 4/2013 Baluja et al.
8,447,032 B1 5/2013 Covell et al.
(Continued)

FOREIGN PATENT DOCUMENTS

WO 0211123 2/2002

OTHER PUBLICATIONS

Xiao, "A Study on Music Retrieval based on Audio Fingerprinting," Department of Information Science and Intelligent Systems: Graduate School of Advanced Technology and Science: The University of Tokushima, Sep. 2013, 79 pages.
(Continued)

*Primary Examiner* — Paul C McCord
(74) *Attorney, Agent, or Firm* — Hanley, Flight & Zimmerman, LLC

(57) ABSTRACT

A machine may be configured to generate one or more audio fingerprints of one or more segments of audio data. The machine may access audio data to be fingerprinted and divide the audio data into segments. For any given segment, the machine may generate a spectral representation from the segment; generate a vector from the spectral representation; generate an ordered set of permutations of the vector; generate an ordered set of numbers from the permutations of the vector; and generate a fingerprint of the segment of the audio data, which may be considered a sub-fingerprint of the audio data. In addition, the machine or a separate device may be configured to determine a likelihood that candidate audio data matches reference audio data.

23 Claims, 12 Drawing Sheets

(56) References Cited

U.S. PATENT DOCUMENTS

| | | | |
|---|---|---|---|
| 8,660,296 | B1 | 2/2014 | Ioffe |
| 9,143,784 | B2 | 9/2015 | Yagnik et al. |
| 9,158,842 | B1 | 10/2015 | Yagnik et al. |
| 9,286,902 | B2 | 3/2016 | Han et al. |
| 9,589,283 | B2 | 3/2017 | Kim et al. |
| 9,684,715 | B1 * | 6/2017 | Ross .................... G06F 16/683 |
| 10,229,689 | B2 | 3/2019 | Han et al. |
| 2002/0083060 | A1 | 6/2002 | Wang et al. |
| 2010/0017195 | A1 | 1/2010 | Villemoes |
| 2010/0067710 | A1 | 3/2010 | Hendriks et al. |
| 2010/0257129 | A1 | 10/2010 | Lyon et al. |
| 2011/0075851 | A1 | 3/2011 | LeBoeuf et al. |
| 2011/0191577 | A1 | 8/2011 | Tian et al. |
| 2012/0065966 | A1 | 3/2012 | Wang |
| 2014/0280265 | A1 | 9/2014 | Wang |
| 2014/0310006 | A1 | 10/2014 | Anguera Miro et al. |
| 2015/0170660 | A1 | 6/2015 | Han et al. |
| 2016/0217799 | A1 | 7/2016 | Han et al. |

OTHER PUBLICATIONS

Haitsma et al., "A Highly Robust Audio Fingerprinting System," Ismir (vol. 2002, pp. 107-115). Oct. 13, 2002, 9 pages.

Covell et al., "Waveprint: Efficient wavelet-based audio fingerprinting," Pattern recognition 41.11. Nov. 30, 2008, 4 pages.

Zhang et al., "Heuristic Approach for Generic Audio Data Segmentation and Annotation," Proceedings of the seventh ACM international conference on Multimedia (Part 1). ACM, 1999. Oct. 30, 1999, 10 pages.

Baluja et al. "Audio Fingerprinting: Combining Computer Vision & Data Stream Processing," Acoustics, Speech and Signal Processing, 2007. ICASSP 2007, IEEE International Conference on vol. 2., Apr. 15, 2007, 5 pages.

Lu et al., "A Robust Audio Classification and Segmentation Method," Proceedings of the ninth ACM international conference on Multimedia, ACM, Oct. 1, 2001, 9 pages.

Haitsma, "Philips Audio Fingerprinting Technology," Philips Research Presentation—Philips Audio Fingerprinting Technology, Sep. 26, 2002, 16 pages.

Kim et al., "Audio Classification Based on MPEG-7 Spectral Basis Representations," IEEE Transactions on Circuits and Systems for Video Technology 14.5 (2004), May 1, 2004, 10 pages.

Lu et al., "Content-Based Audio Segmentation Using Support Vector Machines," Proceedings of be IEEE International Conference on Multimedia and Expo (ICME 2001), Aug. 22, 2001, 4 pages.

United States Patent and Trademark Office, "Notice of Allowability," issued in connection with U.S. Appl. No. 15/008,042, dated Feb. 15, 2019, 2 pages.

United States Patent and Trademark Office, "Notice of Allowance and Fee(s) Due," issued in connection with U.S. Appl. No. 15/008,042, dated Oct. 12, 2018, 8 pages.

United States Patent and Trademark Office, "Non-Final Office action," issued in connection with U.S. Appl. No. 15/008,042, dated Feb. 22, 2018, 16 pages.

United States Patent and Trademark Office, "Restriction Requirement," issued in connection with U.S. Appl. No. 15/008,042, dated Sep. 8, 2017, 6 pages.

United States Patent and Trademark Office, "Notice of Allowance and Fee(s) Due," issued in connection with U.S. Appl. No. 14/107,923, dated Dec. 18, 2015, 18 pages.

United States Patent and Trademark Office, "Restriction Requirement," issued in connection with U.S. Appl. No. 14/107,923, dated Sep. 8, 2015, 6 pages.

* cited by examiner

Example of determining high likelihood of match

Example of determining low likelihood of match

AUDIO FINGERPRINTING

RELATED APPLICATIONS

This application is a Continuation of U.S. patent application Ser. No. 15/008,042, filed Jan. 27, 2016, which is a Continuation of U.S. application Ser. No. 14/107,923, filed Dec. 16, 2013, both of which are incorporated herein by reference in their entireties.

TECHNICAL FIELD

The subject matter disclosed herein generally relates to the processing of data. Specifically, the present disclosure addresses systems and methods to facilitate audio fingerprinting.

BACKGROUND

Audio information (e.g., sounds, speech, music, or any suitable combination thereof) may be represented as digital data (e.g., electronic, optical, or any suitable combination thereof). For example, a piece of music, such as a song, may be represented by audio data, and such audio data may be stored, temporarily or permanently, as all or part of a file (e.g., a single-track audio file or a multi-track audio file). In addition, such audio data may be communicated as all or part of a stream of data (e.g., a single-track audio stream or a multi-track audio stream).

BRIEF DESCRIPTION OF THE DRAWINGS

Some embodiments are illustrated by way of example and not limitation in the figures of the accompanying drawings.

DETAILED DESCRIPTION

Example methods and systems are directed to generating and utilizing one or more audio fingerprints. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine (e.g., an audio processing machine) may form all or part of an audio fingerprinting system, and such a machine may be configured (e.g., by software modules) to generate one or more audio fingerprints of one or more segments of audio data. According to various example embodiments, the machine may access audio data to be fingerprinted and divide the audio data into segments (e.g., overlapping segments). For any given segment (e.g., for each segment), the machine may generate a spectral representation (e.g., spectrogram) from the segment of audio data; generate a vector (e.g., a sparse binary vector) from the spectral representation; generate an ordered set of permutations of the vector; generate an ordered set of numbers from the permutations of the vector; and generate a fingerprint of the segment of the audio data (e.g., a sub-fingerprint of the audio data).

In addition, the machine (e.g., the audio processing machine) may form all or part of an audio identification system, and the machine may be configured (e.g., by software modules) to determine a likelihood that candidate audio data (e.g., an unidentified song submitted as a candidate to be identified) matches reference audio data (e.g., a known song). According to various example embodiments, the machine may access the candidate audio data and the reference audio data, and the machine may generate fingerprints from multiple segments of each. For example, the machine may generate first and second reference fingerprints from first and second segments of the reference audio data, and the machine may generate first and second candidate fingerprints from first and second segments of the candidate audio data. Based on these four fingerprints (e.g., based on at least these four fingerprints), the machine may determine a likelihood that the candidate audio data matches the reference audio data and cause a device (e.g., user device) to present the determined likelihood (e.g., as a response to a query from a user).

Figure 1:
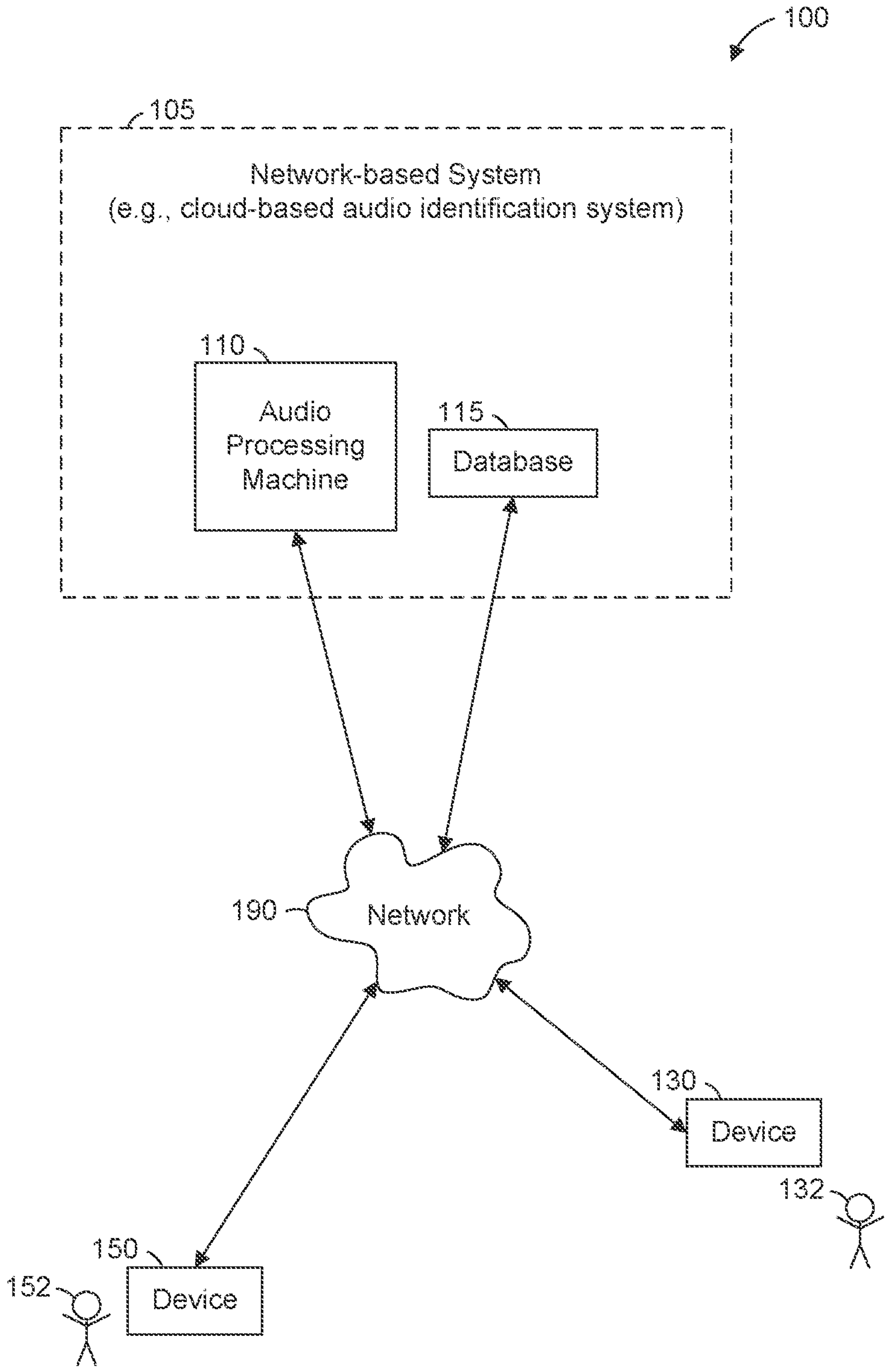
FIG. 1 is a network diagram illustrating a network environment suitable for audio fingerprinting, according to some example embodiments.

FIG. 1 is a network diagram illustrating a network environment 100 suitable for audio fingerprinting, according to some example embodiments. The network environment 100 includes an audio processing machine 110, a database 115, and devices 130 and 150, all communicatively coupled to each other via a network 190. The audio processing machine 110, the database 115, and the devices 130 and 150 may each be implemented in a computer system, in whole or in part, as described below with respect to FIG. 12.

The database 115 may store one or more pieces of audio data (e.g., for access by the audio processing machine 110). The database 115 may store one or more pieces of reference audio data (e.g., audio files, such as songs, that have been previously identified), candidate audio data (e.g., audio files of songs having unknown identity, for example, submitted by users as candidates for identification), or any suitable combination thereof.

The audio processing machine 110 may be configured to access audio data from the database 115, from the device 130, from the device 150, or any suitable combination thereof. One or both of the devices 130 and 150 may store one or more pieces of audio data (e.g., reference audio data, candidate audio data, or both). The audio processing machine 110, with or without the database 115, may form all or part of a network-based system 105. For example, the network-based system 105 may be or include a cloud-based audio processing system (e.g., a cloud-based audio identification system).

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the audio processing machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
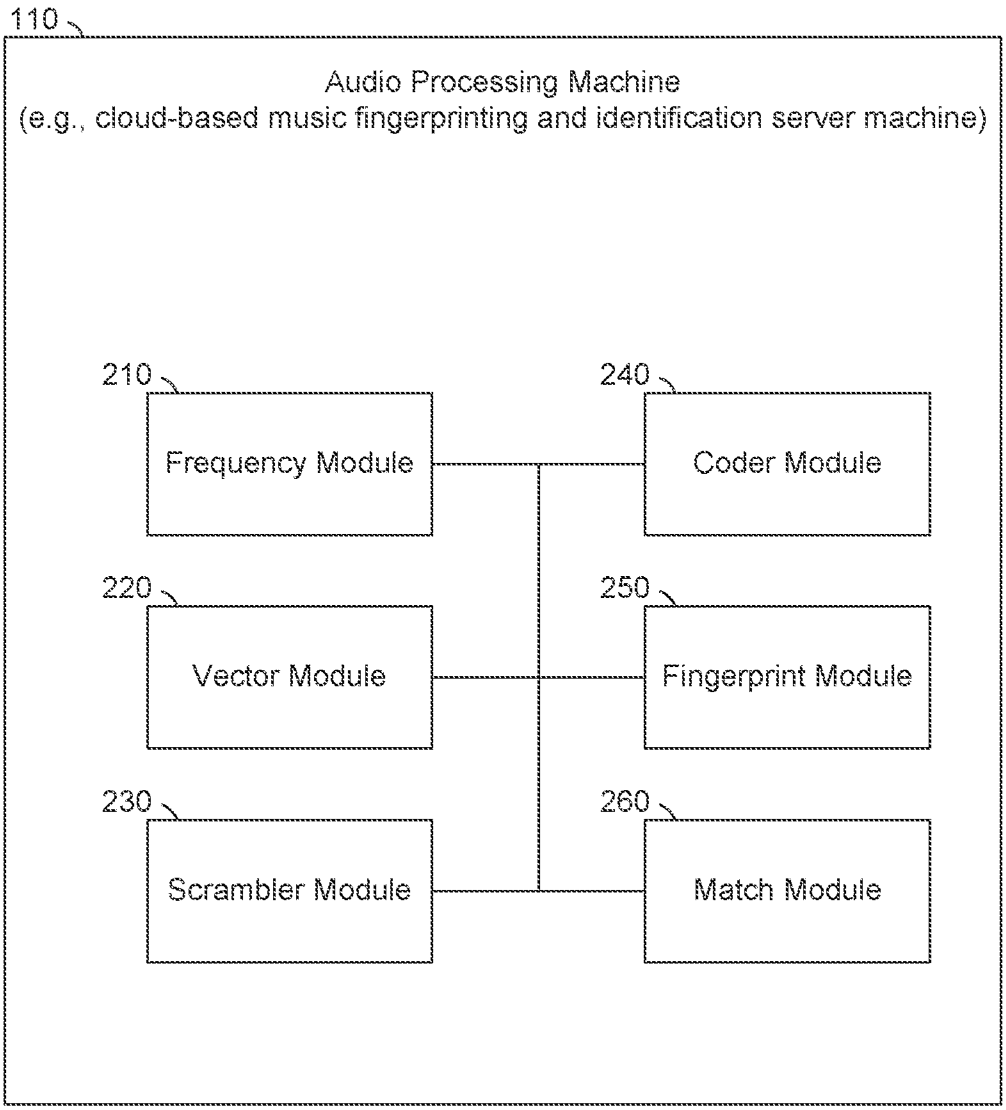
FIG. 2 is a block diagram illustrating components of an audio processing machine suitable for audio fingerprinting, according to some example embodiments.

FIG. 2 is a block diagram illustrating components of the audio processing machine 110, according to some example embodiments. In some example embodiments, the audio processing machine 110 is configured to function as a cloud-based music fingerprinting server machine (e.g., configured to provide a cloud-based music fingerprinting service to the users 132 and 152), a cloud-based music identification server machine (e.g., configured to provide a cloud-based music identification service to the users 132 and 152), or both.

The audio processing machine 110 is shown as including a frequency module 210, a vector module 220, a scrambler module 230, a coder module 240, a fingerprint module 250, and a match module 260, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
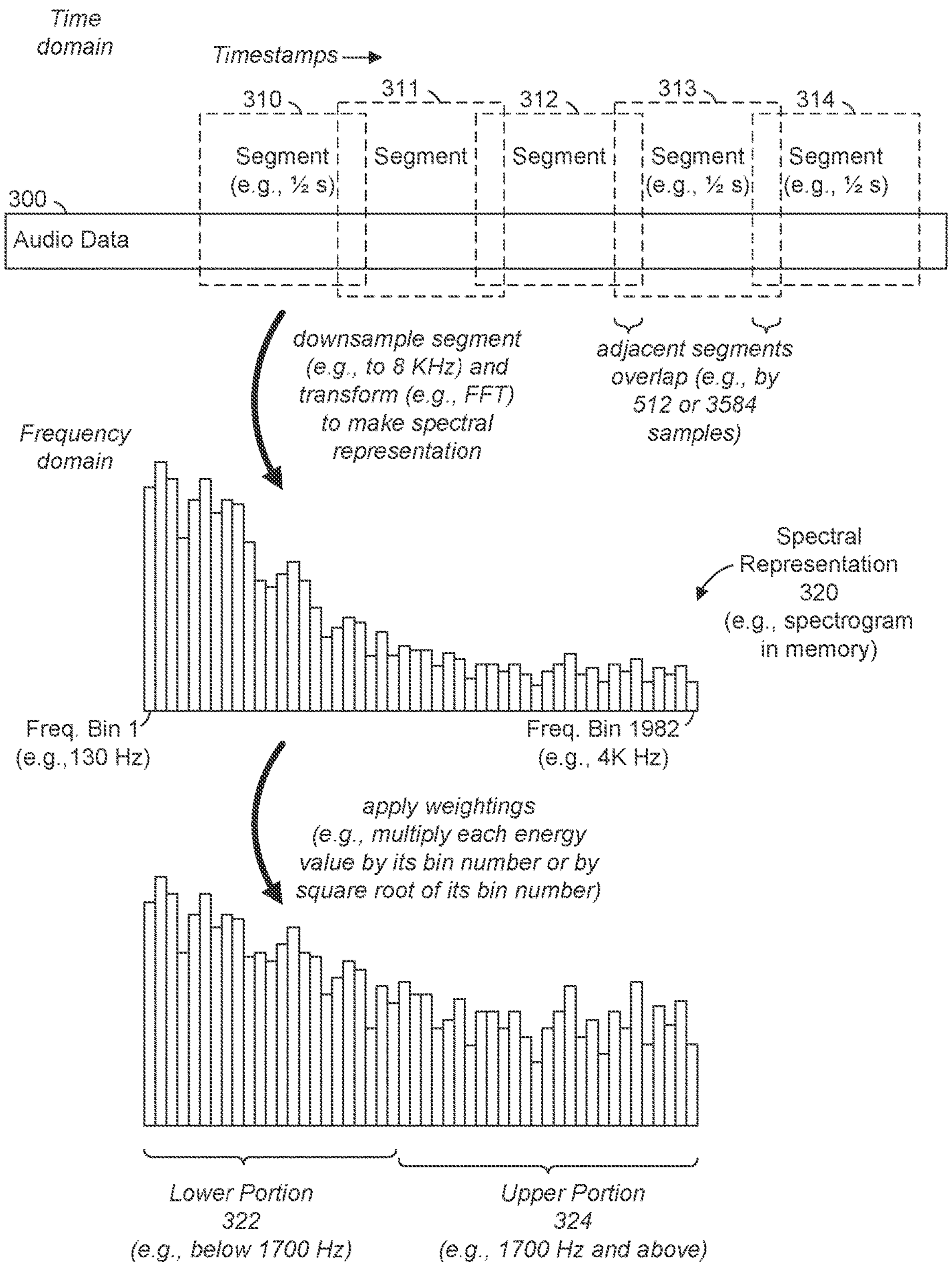
FIGS. 3-6 are conceptual diagrams illustrating operations in audio fingerprinting, according to some example embodiments.

FIGS. 3-6 are conceptual diagrams illustrating operations in audio fingerprinting, according to some example embodiments. At the top of FIG. 3, audio data 300 is shown in the time domain. Examples of the audio data 300 include an audio file (e.g., containing a single-channel or multi-channel recording of a song), an audio stream (e.g., including one or more channels or tracks of audio information), or any portion thereof. Segments 310, 311, 312, 313, and 314 of the audio data 300 are shown as overlapping segments 310-314. For example, the segments 310-314 may be half-second portions (e.g., 500 milliseconds in duration) of the audio data 300, and the segments 310-314 may overlap such that adjacent segments (e.g., segments 313 and 314) overlap each other by a sixteenth of a second (e.g., 512 audio samples, sampled at 8 KHz). In some example embodiments, a different amount of overlap is used (e.g., 448 milliseconds or 3584 samples, sampled at 8 KHz). As shown in FIG. 3, the segments 310-314 may each have a timestamp (e.g., a timecode relative to the audio data 300), and these timestamps may increase (e.g., monotonically) throughout the duration of the audio data 300.

As shown by a curved arrow in the upper portion of FIG. 3, any segment (e.g., segment 310) of the audio data 300 may be downsampled and transformed to obtain a spectral representation (e.g., spectral representation 320) of that segment. For example, FIG. 3 depicts the segments 310 being downsampled (e.g., to 8 KHz) and mathematically transformed (e.g., by a Fast Fourier Transform (FFT)) to make the spectral representation 320 (e.g., a spectrogram of the segment 310, stored temporarily or permanently in a memory). The spectral representation 320 indicates energy values for a set of frequencies. FIG. 3 depicts the spectral representation 320 as indicating an energy value for each of 1,982 frequencies, which are denoted as "frequency bins" in FIG. 3. For example, Frequency Bin 1 may correspond to 130 Hz, and its energy value with respect to the segment 310 may be indicated within the spectral representation 320. As another example, Frequency Bin 1982 may correspond to 4000 Hz, and its energy value with respect to the segment 310 may also be indicated within the spectral representation 320.

As shown by curved arrow in the lower portion of FIG. 3, the spectral representation 320 may be processed (e.g., by the audio processing machine 110) by applying weightings to one or more of its frequencies (e.g., to one or more of its frequency bins). A separate weighting factor may be applied for each frequency, for example, based on the position of each frequency within the spectral representation 320. The position of a frequency in the spectral representation 320 may be expressed as its frequency bin number (e.g., Frequency Bin 1 for the first and lowest frequency represented, Frequency Bin 2 for the second, next-lowest frequency represented, and Frequency Bin 1982 for the 1982$^{nd}$ and highest frequency represented). For example, the audio processing machine 110 may multiply each energy value by its frequency bin number (e.g., 1 for Frequency Bin 1, or 1982 for Frequency Bin 1982). As another example, each energy value may be multiplied by the square root of its frequency bin number (e.g., 1 for Frequency Bin 1, or sqrt(1982) for Frequency Bin 1982). FIG. 3 further depicts the spectral representation 320 (e.g., after such weightings are applied) being subdivided into multiple portions. As shown, a lower portion 322 of the spectral representation 320 includes frequencies (e.g., frequency bins) that are below a predetermined threshold frequency (e.g., 1700 Hz), and an upper portion 324 of the spectral representation 320 includes frequencies (e.g., frequency bins) that are at least the predetermined threshold frequency (e.g., 1700 Hz). Although FIGS. 3 and 4 show only two portions of the spectral representation 320, various example embodiments may divide the spectral representation 320 into more than two portions (e.g., lower, middle, and upper portions).

Figure 4:
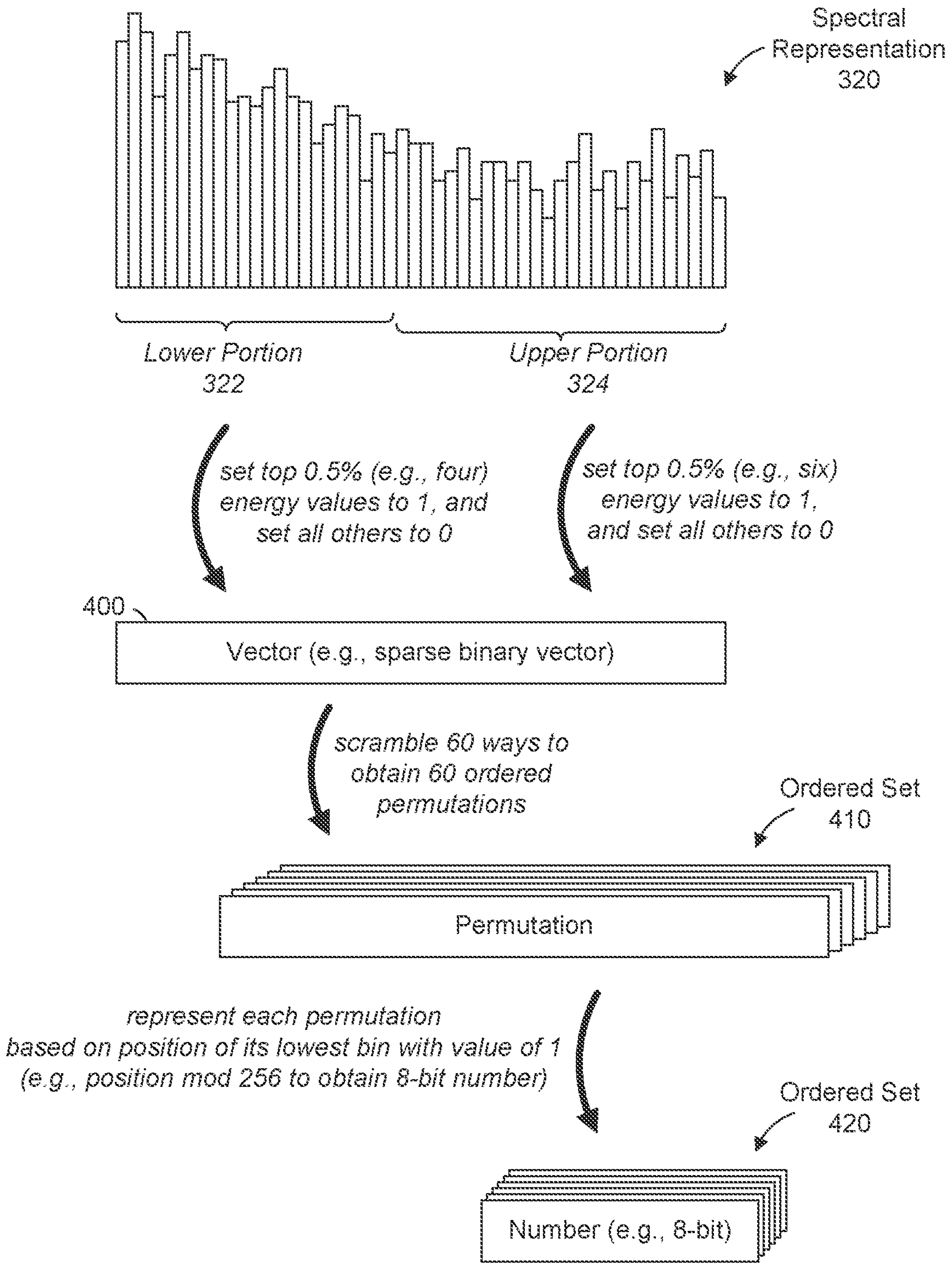

As shown in FIG. 4, the spectral representation 320 may be used (e.g., by the audio processing machine 110) as a basis for generating a vector 400. For example, the audio processing machine 110 may set a representative group of highest energy values in the lower portion 322 of the spectral representation 320 to a single common non-zero value (e.g., 1) and set all other energy values to zero. FIG. 4 depicts setting the top 0.5% energy values (e.g., the top four energy values) from the lower portion 322 to a value of one, while setting all other values from the lower portion 322 to a value of zero. As another example, the audio processing machine 110 may set a representative group of highest energy values in the upper portion 324 of the spectral representation 320 to a single common non-zero value (e.g., 1), though this value need not be the same value as used for the lower portion 322 of the spectral representation 320, and set all other energy values to zero. FIG. 4 depicts setting the top 0.5% energy values (e.g., the top six energy values) from the upper portion 324 to a value of one, while setting all other values from the upper portion 324 to a value of zero. Accordingly, the resulting vector 400 may be a sparse vector, a binary vector, or both (e.g., a sparse binary vector). Although the example embodiments depicted in FIG. 4 utilize the top 0.5% energy values from the lower portion 322 and the upper portion 324, various example embodiments may utilize a different percentage, and may utilize differing percentages for the lower portion 322 than the upper portion 324.

FIG. 4 additionally shows that, once the vector 400 is obtained (e.g., generated), it may be permutated (e.g., scrambled or rearranged) to obtain an ordered set 410 of one or more permutations of the vector 400. For example, the audio processing machine 110 may scramble the vector 400 a predetermined number of times in a predetermined number of ways (e.g., manners) and in a predetermined sequential order. FIG. 4 depicts the vector 400 being scrambled 60 different ways to obtain 60 different permutations, which may be ordered permutations (e.g., maintained in the same sequential order as used to scramble the vector 400). In some example embodiments, the predetermined ways to permutate the vector 400 are mutually unique and contain no duplicate ways to permutate the vector 400. In alternative example embodiments, the predetermined ways to permutate the vector 400 are not mutually unique and include at least one repeated or duplicated way to permutate the vector 400.

As shown in FIG. 4, after the ordered set 410 of permutations has been obtained (e.g., generated), the audio processing machine 110 may generate (e.g., calculate) an ordered set 420 of numbers, each of which respectively represents one of the permutations in the ordered set 410 of permutations. For example, a permutation may be represented by a number that is generated based on the position of its lowest frequency (e.g., lowest bin number) that has a non-zero value (e.g., energy value). For example, if the permutation has a value of zero for Frequency Bin 1 and a value of one for Frequency Bin 2, the number that represents this permutation may be generated based on "2." As another example, if the permutation has values of zero for Frequency Bins 1-9 and a value of one for Frequency Bin 10, the number that represents this permutation may be generated based on "10." As a further example, if the permutation has values of zero for Frequency Bins 1-9 and 11-14 and values of one for Frequency Bins 10 and 15, the number that represents this permutation may be generated based on "10." Moreover, as shown in FIG. 4, the number that represents a permutation may be generated as an 8-bit number (e.g., by performing a modulo 256 operation on the position of the lowest frequency that has a non-zero value). By generating such a number for each of the permutations in the ordered set 410 of permutations, the audio processing machine 110 may generate the ordered set 420 of numbers.

Figure 5:
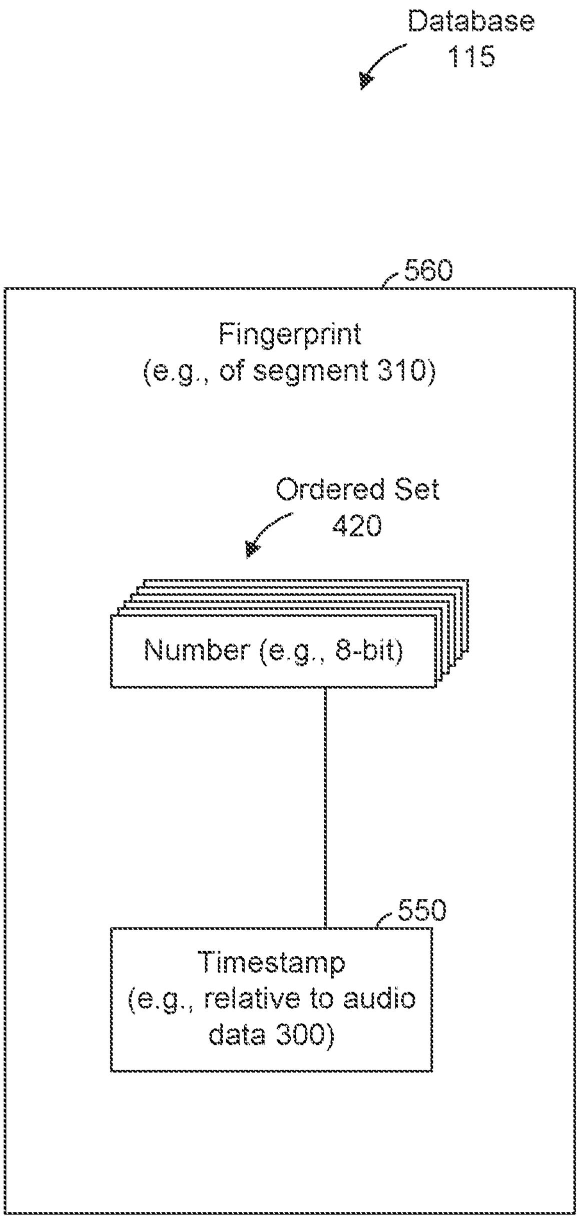

As shown in FIG. 5, the ordered set 420 of numbers (e.g., 8-bit numbers) may be stored in the database 115 as a fingerprint 560 of the segment 310 of the audio data 300. The fingerprint 560 of the segment 310 may be conceptualized as a sub-fingerprint (e.g., a partial fingerprint) of the audio data 300, and the database 115 may correlate the fingerprint 560 with the audio data 300 (e.g., store the fingerprint 560 with a reference to an identifier of the audio data 300). FIG. 5 depicts the ordered set 420 being associated with (e.g., correlated with) a timestamp 550 (e.g., timecode) for the segment 310. As noted above, the timestamp 550 may be relative to the audio data 300. Accordingly, the audio processing machine 110 may store (e.g., within the database 115) the ordered set 420 of numbers with the timestamp 550 as the fingerprint 560 of the segment 310. The fingerprint 560 may thus function as a lightweight representation of the segment 310, and such a lightweight representation may be suitable (e.g., in real-time applications) for comparing with similarly generated fingerprints of segments of other audio data (e.g., in determining a likelihood that the audio data 300 matches other audio data). In some example embodiments, the ordered set 420 of numbers is rearranged (e.g., concatenated) into a smaller set of ordered numbers (e.g., from 60 8-bit numbers to 20 24-bit numbers or 15 32-bit numbers), and this smaller set of ordered numbers may be stored as the fingerprint 560 of the segment 310.

Figure 6:
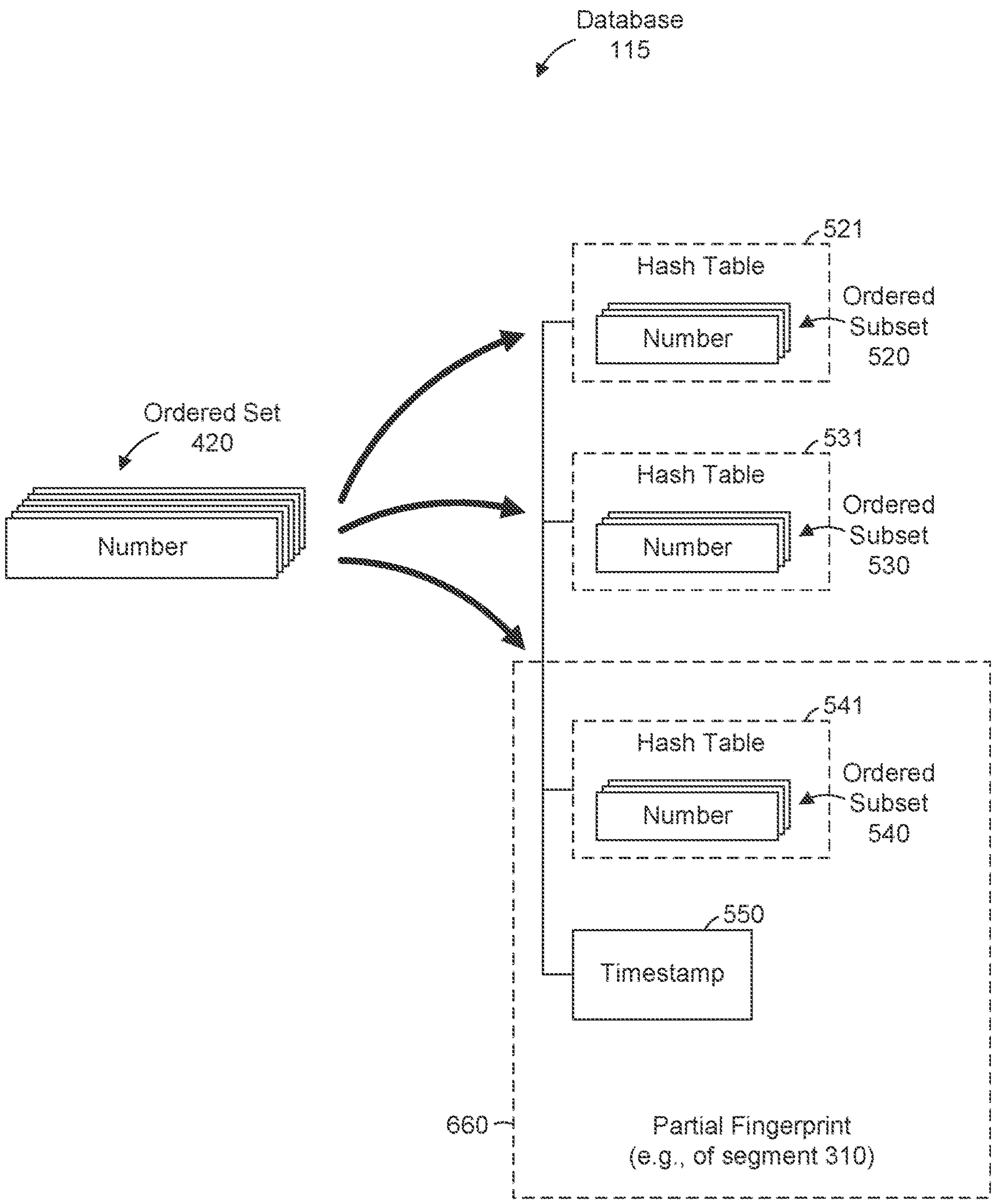

As shown in FIG. 6, some example embodiments of the audio processing machine 110 subdivide the ordered set 420 of numbers (e.g., 60 8-bit numbers) into multiple ordered subsets 520, 530, and 540. Although only three ordered subsets 520, 530, 540 are shown, various example embodiments may utilize other quantities of ordered subsets (e.g., 20 24-bit numbers or 15 32-bit numbers). These ordered subsets 520, 530, and 540 may be stored in the database 115 within their respective hash tables 521, 531, and 541, all of which may be associated with (e.g., assigned to, correlated with, or mapped to) the timestamp 550 for the segment 310. In such example embodiments, a single hash table (e.g., hash table 541 that stores the ordered subset 540) and the timestamp 550 may be stored as a partial fingerprint 660 of the segment 310. The partial fingerprint 660 may therefore function as an even more lightweight representation (e.g., compared to the fingerprint 560) of the segment 310. Such a very lightweight representation may be especially suitable (e.g., in real-time applications) for comparing with similarly generated partial fingerprints of segments of an audio data (e.g., in determining a likelihood that the audio data 300 matches other audio data). The database 115 may correlate the partial fingerprint 660 with the audio data 300 (e.g., store the partial fingerprint 660 with a reference to an identifier of the audio data 300).

Figure 7:
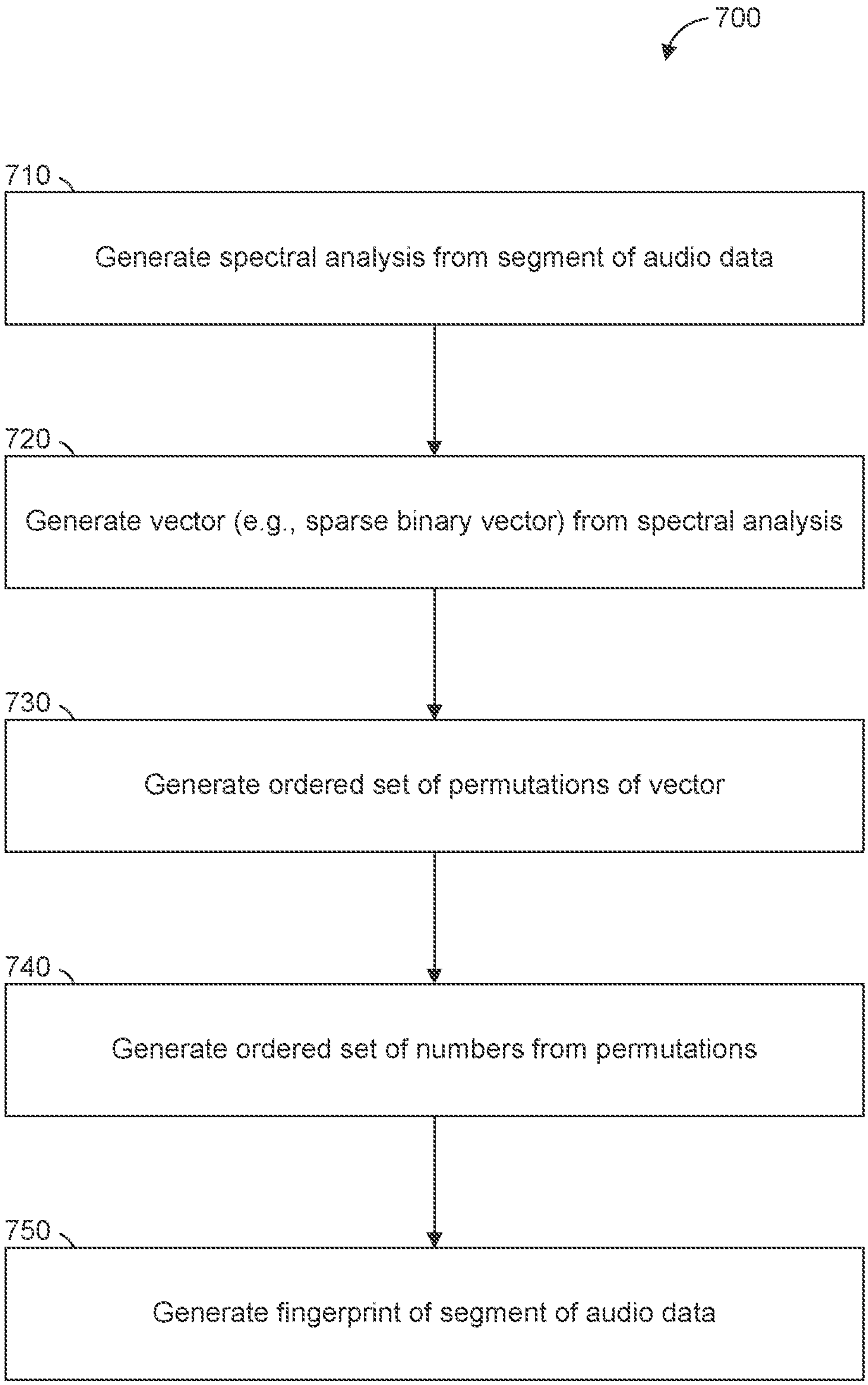
FIGS. 7 and 8 are flowcharts illustrating operations of the audio processing machine in performing a method of audio fingerprinting, according to some example embodiments.
Figure 8:
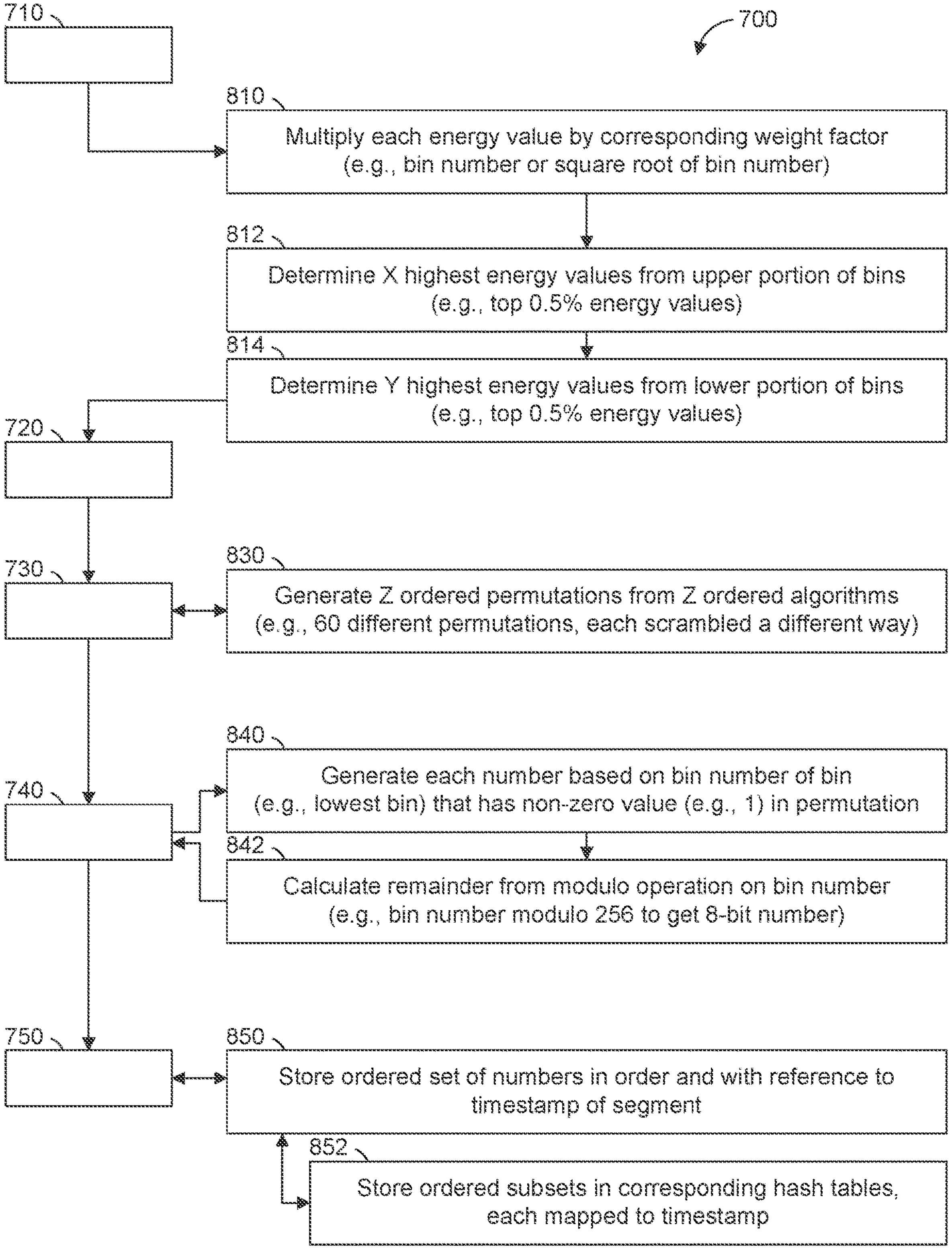

FIGS. 7 and 8 are flowcharts illustrating operations of the audio processing machine 110 in performing a method 700 of audio fingerprinting for the segment 310 of the audio data 300, according to some example embodiments. Operations in the method 700 may be performed by the audio processing machine 110, using modules described above with respect to FIG. 2. In some example embodiments, one or both of the devices 130 and 150 may perform the method 700 (e.g., by inclusion and execution of modules described above with respect to FIG. 2). As shown in FIG. 7, the method 700 includes operations 710, 720, 730, 740, and 750.

In operation 710, the frequency module 210 generates the spectral representation 320 of the segment 310 of the audio data 300. As noted above, the spectral representation 320 indicates energy values for a set of frequencies (e.g., frequency bins).

In operation 720, the vector module 220 generates the vector 400 from the spectral representation 320 generated in operation 710. As noted above, the vector 400 may be a sparse vector, binary vector, or both. Moreover, as described above with respect to FIG. 4, the generated vector 400 may contain a zero value for each frequency in the set of frequencies (e.g., frequency bins) except for representing a first group of highest energy values from a first portion of the set of frequencies with a single common non-zero value (e.g., setting the top 0.5% energy values to 1) and representing a second group of highest energy values from a second portion of the set of frequencies with a single common non-zero value (e.g., setting the top 0.5% energy values to 1), which may be the same single common value used to represent the first group of highest energy values.

In operation 730, the scrambler module 230 generates the ordered set 410 of permutations of the vector 400. As noted above, with respect to FIG. 4, the ordered set 410 of permutations may be generated by permutating the vector 400 a predetermined number of times in a predetermined number of ways (e.g., manners) and in a predetermined sequential order. Each permutation in the ordered set 410 of permutations may be generated in a corresponding manner that repositions instances of the common value to permutate (e.g., scramble or rearrange) the vector 400. In some example embodiments, each permutation has its own corresponding algorithm for scrambling or rearranging the vector 400. In other example embodiments, a particular algorithm (e.g., a randomizer) may be used for multiple permutations of the vector 400 (e.g., with each generated permutation seeding the algorithm for the next permutation to be generated).

In operation 740, the coder module 240 generates the ordered set 420 of numbers from the ordered set 410 of permutations of the vector 400. As noted above with respect to FIG. 4, each ordered number in the ordered set 420 of numbers may respectively represent a corresponding ordered permutation in the ordered set 440 of permutations. Moreover, such an ordered number may represent its corresponding permutation by indicating a position of an instance of the single common non-zero value (e.g., 1) within the corresponding permutation.

In operation 750, the fingerprint module 250 generates the fingerprint 560 of the segment 310 of the audio data 300. The generating of the fingerprint 560 may be based on the ordered set 420 of numbers generated in operation 740. As noted above with respect to FIG. 5, the fingerprint 560 may form all or part of a representation of the segment 310 of the audio data 300, and the fingerprint 560 may be suitable for comparing with similarly generated fingerprints of segments of other audio data.

As shown in FIG. 8, the method 700 may include one or more of operations 810, 812, 814, 830, 840, 842, and 850. One or more of operations 810, 812, 814 may be performed between operations 710 and 720.

In operation 810, the vector module 220 multiplies each energy value in the spectral representation 320 by a corresponding weight factor. The weight factor for an energy value may be determined based on a position (e.g., ordinal position) of the energy value's corresponding frequency (e.g., frequency bin) within a set of frequencies represented in the spectral representation 320. As noted above with respect to FIG. 3, the position of the frequency for an energy value may be expressed as a frequency bin number. For example, the vector module 220 may multiply each energy value by its frequency bin number (e.g., 1 for Frequency Bin 1, or 1982 for Frequency Bin 1982). As another example, the vector module 220 may multiply each energy value by the square root of its frequency bin number (e.g., 1 for Frequency Bin 1, or sqrt(1982) for Frequency Bin 1982).

In operation 812, the vector module 220 determines a representative group of highest energy values (e.g., top X energy values, such as the top 0.5% energy values or the top four energy values) from the upper portion 324 of the spectral representation 320 (e.g., weighted as described above with respect operation 810). This may enable the vector module 220 to set this representative group of highest energy values to the single common non-zero value (e.g., 1) in generating the vector 400 in operation 720. In some example embodiments, operation 812 includes ranking energy values for frequencies at or above a predetermined threshold frequency (e.g., 1700 Hz) in the spectral representation 320 and determining the representative group from the upper portion 324 based on the ranked energy values.

In operation 814, the vector module 220 determines a representative group of highest energy values (e.g., top Y energy values, such as the top 0.5% energy values or the top six energy values) from the lower portion 322 of the spectral representation 320 (e.g., weighted as described above with respect operation 810). This may enable the vector module 220 to set this representative group of highest energy values to the single common non-zero value (e.g., 1) in generating the vector 400 in operation 720. In certain example embodiments, operation 814 includes ranking energy values for frequencies below a predetermined threshold frequency (e.g., 1700 Hz) in the spectral representation 320 and determining the representative group from the lower portion 322 based on the ranked energy values.

Operation 830 may be performed as part (e.g., a precursor task, a subroutine, or a portion) of operation 730, in which the scrambler module 230 generates the ordered set 410 of permutations of the vector 400. As noted above with respect to FIG. 4, the predetermined ways to permutate the vector 400 may be mutually unique. In operation 830, the scrambler module 230 generates each permutation in the ordered set 410 of permutations by mathematically transforming the vector 400 in a manner that is unique to that permutation within the ordered set 410 of permutations.

One or both of operations 840 and 842 may be performed as part of operation 740, in which the coder module 240 generates the ordered set 420 of numbers from the ordered set 410 of permutations. In operation 840, the coder module 240 generates each number in the ordered set 420 of numbers based on a position (e.g., a frequency bin number) of an instance of the single common non-zero value (e.g., 1) within the corresponding permutation for that number. For example, the coder module 240 may generate each number in the ordered set 420 of numbers based on the lowest position (e.g., lowest frequency bin number) of any instance of the single common non-zero value (e.g., 1) within the corresponding permutation for the number that is being generated.

In operation 842, the coder module 240 calculates a remainder from a modulo operation performed on a numerical representation of the position (e.g., the frequency bin number) discussed above with respect to operation 840. For example, the coder module 240, in generating a number in the ordered set 420 of numbers, may calculate the remainder of a modulo 256 operation performed on the frequency bin number of the lowest frequency bin occupied by the single common non-zero value (e.g., 1) in the permutation that corresponds to the number being generated.

Operation 850 may be performed as part of operation 750, in which the fingerprint module 250 generates the fingerprint 560. In operation 850, the fingerprint module 250 stores the ordered set 420 of numbers in the database 115 with a reference to the timestamp 550 of the segment 310 of the audio data 300 (e.g., as discussed above with respect to FIG. 5). In some example embodiments, the storage of the ordered set 420 with the timestamp 550 generates (e.g., creates) the fingerprint 560 within the database 115. As noted above, according to various example embodiments, the ordered set 420 of numbers may be rearranged (e.g., concatenated) into a smaller set of ordered numbers (e.g., from 60 8-bit numbers to 20 24-bit numbers or 15 32-bit numbers), and this smaller set of ordered numbers may be stored as the fingerprint 560 of the segment 310.

As shown in FIG. 8, according to some example embodiments, operation 852 may be performed as part of operation 850. In operation 852, the fingerprint module 250 stores the ordered subsets 520, 530, and 540 within their respective hash tables 521, 531, and 541. As discussed above with respect to FIG. 6, each of these hash tables 521, 531, and 541 may be associated with (e.g., assigned to, correlated with, or mapped to) the timestamp 550 for the segment 310. Moreover, the combination of a hash table (e.g., hash table 541) and the timestamp 550 may form all or part of the partial fingerprint 660 of the segment 310 of the audio data 300.

Figure 9:
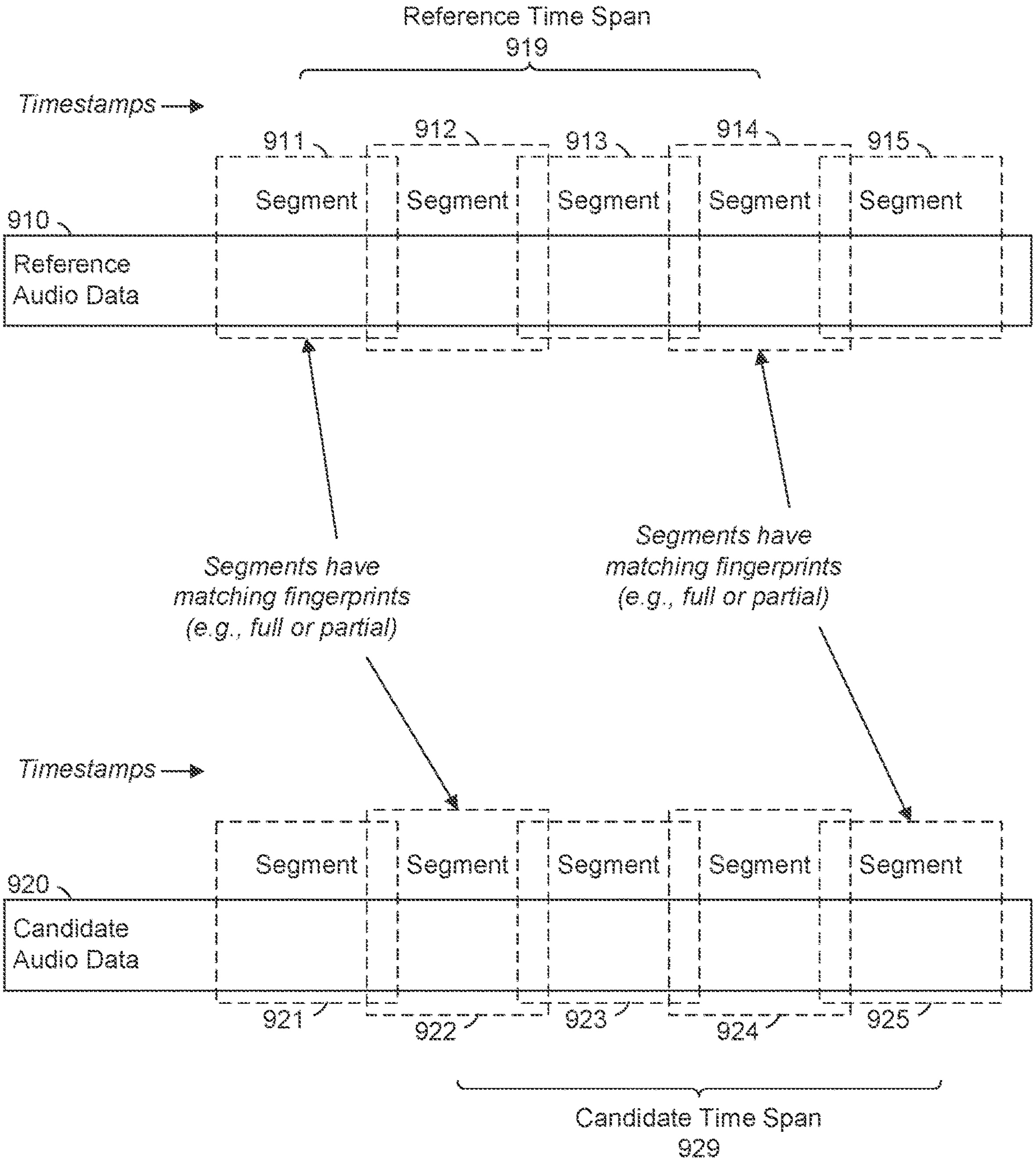
FIGS. 9 and 10 are conceptual diagrams illustrating operations in determining a likelihood of a match between reference and candidate audio data, according to some example embodiments.
Figure 10:
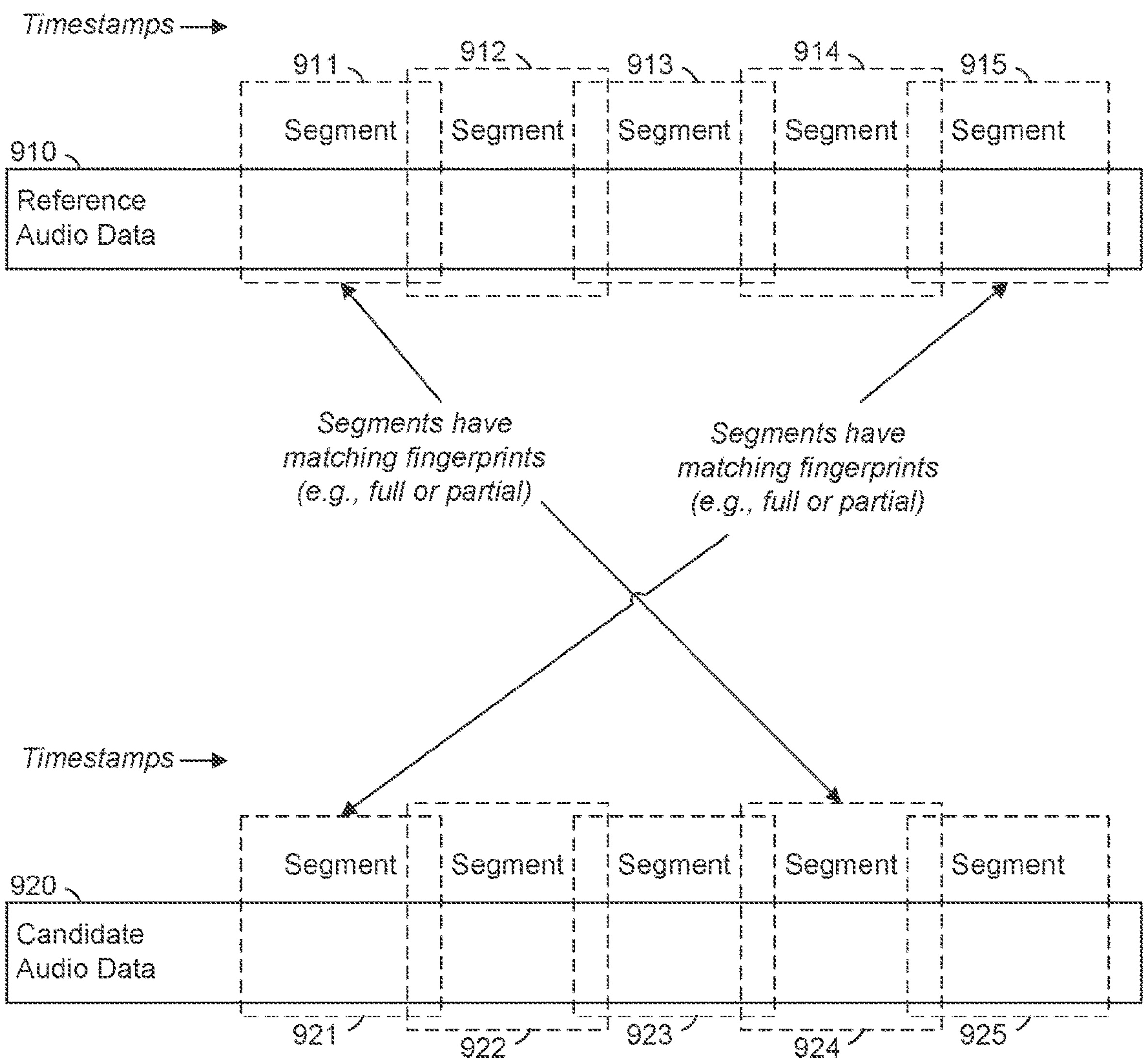

FIGS. 9 and 10 are conceptual diagrams illustrating operations in determining a likelihood of a match between reference audio data 910 and candidate audio data 920, according to some example embodiments. As noted above, the audio processing machine 110 may form all or part of an audio identification system and may be configured to determine a likelihood that the candidate audio data 920 (e.g., an unidentified song) matches the reference audio data 910 (e.g., a known song). In some example embodiments, however, one or more of the devices 130 and 150 is configured to perform such operations. FIG. 9 illustrates an example of determining a high likelihood that the candidate audio data 920 matches the reference audio data 910, while FIG. 10 illustrates an example of a low likelihood that the candidate audio data 920 matches the reference audio data 910.

In FIGS. 9 and 10, the reference audio data 910 is shown as including segments 911, 912, 913, 914, and 915. Examples of the reference audio data 910 include an audio file (e.g., containing a single-channel or multi-channel recording of a song), an audio stream (e.g., including one or more channels or tracks of audio information), or any portion thereof. Segments 911, 912, 913, 914, and 915 of the reference audio data 910 are shown as overlapping segments 911-915. For example, the segments 911-915 may be half-second portions (e.g., 500 milliseconds in duration) of the reference audio data 910, and the segments 911-915 may overlap such that adjacent segments (e.g., segments 914 and 915) overlap each other by a sixteenth of a second (e.g., 512 audio samples, sampled at 8 KHz). In some example embodiments, a different amount of overlap is used (e.g., 448 milliseconds or 3584 samples, sampled at 8 KHz). As shown in FIGS. 9 and 10, the segments 911-915 may each have a timestamp (e.g., a timecode relative to the reference audio data 910), and these timestamps may increase (e.g., monotonically) throughout the duration of the reference audio data 910.

Similarly, the candidate audio data 920 is shown as including segments 921, 922, 923, 924, and 925. Examples of the candidate audio data 920 include an audio file, an audio stream, or any portion thereof. Segments 921, 922, 923, 924, and 925 of the candidate audio data 920 are shown as overlapping segments 921-925. For example, the segments 921-925 may be half-second portions of the candidate audio data 920, and the segments 921-925 may overlap such that adjacent segments (e.g., segments 924 and 925) overlap each other by a sixteenth of a second (e.g., 512 audio samples, sampled at 8 KHz). In some example embodiments, a different amount of overlap is used (e.g., 448 milliseconds or 3584 samples, sampled at 8 KHz). As shown in FIGS. 9 and 10, the segments 921-925 may each have a timestamp (e.g., a timecode relative to the candidate audio data 920), and these timestamps may increase (e.g., monotonically) throughout the duration of the candidate audio data 920.

According to various example embodiments, an individual sub-fingerprint (e.g., fingerprint 560) represents a small time-domain audio segment (e.g., segment 310) and includes results of permutations (e.g., ordered set 420 of numbers) as described above with respect to FIG. 4. These results may be grouped together to form a set of numbers (e.g., ordered set 420 of numbers, with or without further rearrangement) that represent this small time-domain segment (e.g., segment 310). To determine (e.g., declare) a match between the candidate sub-fingerprint and a reference sub-fingerprint, some subset of these permutation results for the candidate sub-fingerprint must match the corresponding permutation results for the reference sub-fingerprint. In some example embodiments, at a least one of the permuted numbers included in the candidate sub-fingerprint (e.g., for segment 922) must match at least one of the permuted numbers included in the reference sub-fingerprint (e.g., for segment 911) for a given timestamp or a given range of timestamps. Accordingly, this would be considered a match for this particular timestamp or range of timestamps.

As shown in FIG. 9, the segment 911 and the segment 922 have matching fingerprints (e.g., full fingerprints, like the fingerprint 560, or partial fingerprints, like the partial fingerprint 660). As also shown in FIG. 9, the segment 914 and the segment 925 have matching fingerprints (e.g., full or partial). Moreover, the segments 911 and 914 are separated in time by a reference time span 919, and the segments 922 and 925 are separated in time by a candidate time span 929. The audio processing machine 110 may accordingly determine that the candidate audio data 920 is a match with the reference audio data 910, or has a high likelihood of being a match with the reference audio data 910, based on one or more factors. For example, such a factor may be the fact that the segment 911 precedes the segment 914, while the segment 922 precedes the segment 925, thus indicating that the matching segments 911 and 922 are in the same sequential order compared to the matching segments 914 and 925. As another example, such a factor may be the fact that the reference time span 919 is equivalent (e.g., exactly) to the candidate time span 929. Even in situations where the reference time span 919 is distinct from the candidate time span 929, the likelihood of a match may be at least moderately high, for example, if the difference is small (e.g., within one segment, within two segments, or within ten segments).

As shown in FIG. 10, the segment 911 and the segment 924 have matching fingerprints (e.g., full or partial). As also shown in FIG. 10, the segment 915 and the segment 921 have matching fingerprints (e.g., full or partial). The audio processing machine 110 may accordingly determine that the candidate audio data 920 is not a match with the reference audio data 910, or has a low likelihood of being a match with the reference audio data 910, based on the fact that the segment 911 precedes the segment 915, while the segment 924 does not precede the segment 921, thus indicating that the matching segments 911 and 924 are not in the same sequential order compared to the matching segments 915 and 921.

Figure 11:
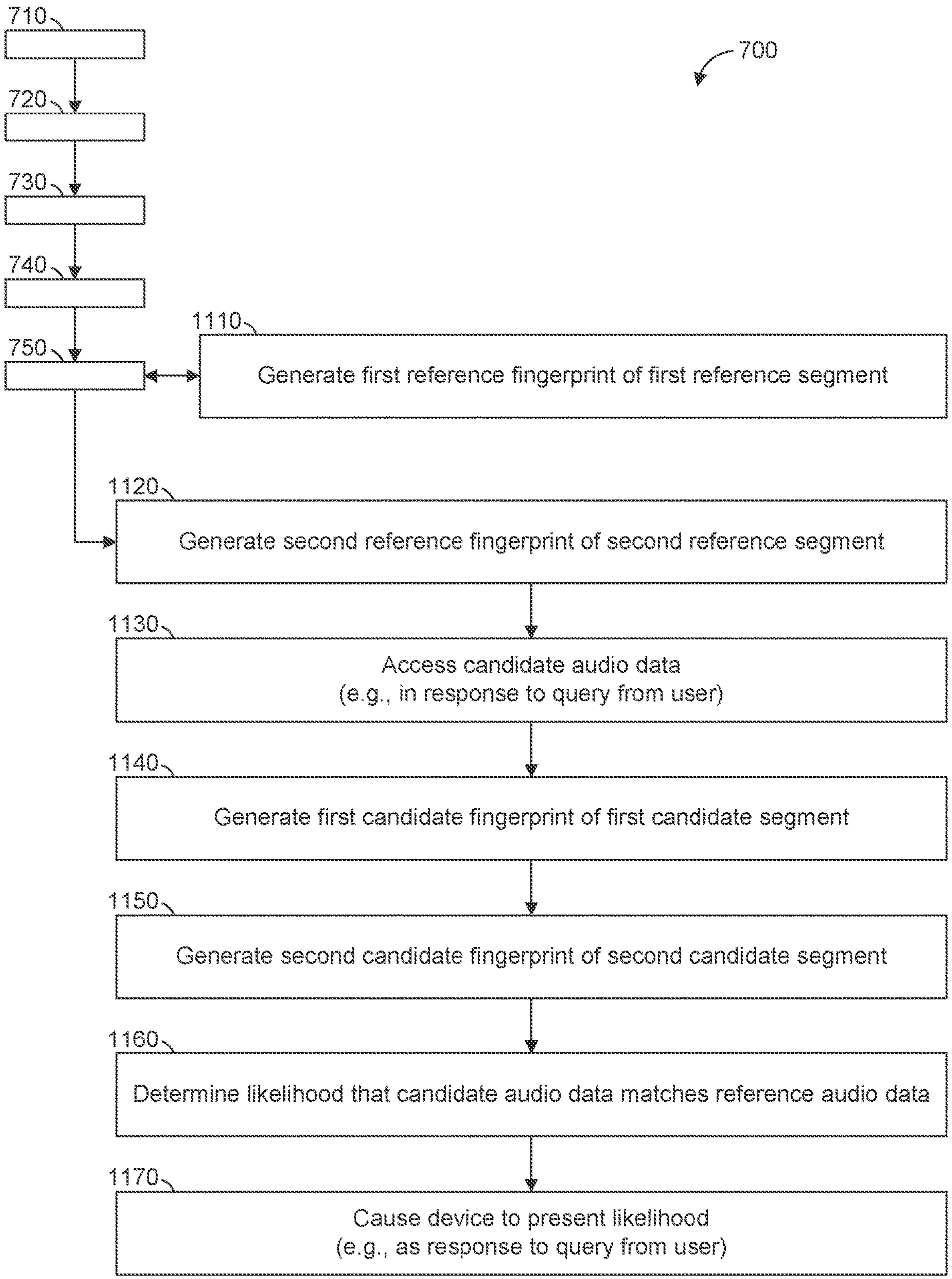
FIG. 11 is a flowchart illustrating operations of the audio processing machine in determining the likelihood of a match between reference and candidate audio data, according to some example embodiments.

FIG. 11 is a flowchart illustrating operations of the audio processing machine 110 in determining the likelihood of a match between the reference audio data 910 and the candidate audio data 920, according to some example embodiments. As shown in FIG. 11, one or more of operations 1110, 1120, 1130, 1140, 1150, 1160, and 1170 may be performed as part of the method 700, discussed above with respect to FIGS. 7 and 8. In alternative example embodiments, one or more of operations 1110-1170 may be performed as a separate method (e.g., without one or more of the operations discussed above with respect to FIGS. 7 and 8).

In operation 1110, which may be performed as part (e.g., a precursor task, a subroutine, or a portion) of operation 750, the fingerprint module 250 generates a first reference fingerprint (e.g., similar to the fingerprint 560) of a first reference segment (e.g., segment 911, which may be the same as the segment 310) of the reference audio data 910, which may be the same as audio data 300. The generating of the first reference fingerprint may be based on an ordered set of numbers (e.g., similar to the ordered set 420 of numbers).

In operation 1120, the fingerprint module 250 generates a second reference fingerprint (e.g., similar to the fingerprint 560) of a second reference segment (e.g., second 914) of the reference audio data 910. This may be performed in a manner similar to that described above with respect to operation 1110.

Accordingly, first and second reference fingerprints may be generated off-line stored in the database 115 (e.g., prior to receiving any queries from users), and the first and second reference fingerprints may be accessed from the database 115 in response to receiving a query.

In operation 1130, the fingerprint module 250 accesses the candidate audio data 920 (e.g., from the database 115, from the device 130, from the device 150, or any suitable combination thereof). For example, the candidate audio data 920 may be accessed in response to a query submitted by the user 132 by the device 130. Such a query may request identification of the candidate audio data 920.

In operation 1140, the fingerprint module 250 generates a first candidate fingerprint (e.g., similar to the fingerprint 560) of a first candidate segment (e.g., segment 922) of the candidate audio data 920. This may be performed in a manner similar to that described above with respect operation 1110.

In operation 1150, the fingerprint module 250 generates a second candidate fingerprint (e.g., similar to the fingerprint 560) of a second candidate segment (e.g., segment 925) of the candidate audio data 920. This may be performed in a manner similar to that described above with respect operation 1120.

In operation 1160, the match module 260 determines a likelihood (e.g., probability, a score, or both) that the candidate audio data 920 matches the reference audio data 910. This determination may be based on one or more of the following factors: the first candidate fingerprint (e.g., of the segment 922) matching the first reference fingerprint (e.g., of the segment 911); the second candidate fingerprint (e.g., of the second 925) matching the second reference fingerprint (e.g., of the segment 914); the first reference segment (e.g., segment 911) preceding the second reference segment (e.g., segment 914); and the first candidate segment (e.g., segment 922) preceding the second candidate segment (e.g., segment 925). According to various example embodiments, the combination (e.g., conjunction) of one or more of these factors may be a basis for performing operation 1160. In some example embodiments, a further basis for performing operation 1160 is the reference time span 919 being equivalent to the candidate time span 929. In certain example embodiments, the further basis for performing operation 1160 is the reference time span 919 being distinct but approximately equivalent to the candidate time span 929 (e.g., within one segment, two segments, or ten segments).

In operation 1170, the match module 260 causes the device 130 to present the likelihood that the candidate audio data 920 matches the reference audio data 910 (e.g., as determined in operation 1160). For example, the match module 260 may communicate the likelihood (e.g., within a message or an alert) to the device 130 in response to a query sent from the device 130 by the user 132. The device 130 may be configured to present the likelihood as a level of confidence (e.g., a confidence score) that the candidate audio data 920 matches the reference audio data 910. Moreover, the match module 260 may access metadata that describes the reference audio data 910 (e.g., song name, artist, genre, release date, album, lyrics, duration, or any suitable combination thereof). Such metadata may be accessed from the database 115. The match module 260 may also communicate some or all of such metadata to the device 130 for presentation to the user 132. Accordingly, performance of one or more of operations 1110-1170 may form all or part of an audio identification service.

According to various example embodiments, one or more of the methodologies described herein may facilitate the fingerprinting of audio data (e.g., generation of a unique identifier or representation of audio data). Moreover, one or more of the methodologies described herein may facilitate identification of an unknown piece of audio data. Hence, one or more the methodologies described herein may facilitate efficient provision of audio fingerprinting services, audio identification services, or any suitable combination thereof.

When these effects are considered in aggregate, one or more of the methodologies described herein may obviate a need for certain efforts or resources that otherwise would be involved in fingerprinting audio data and identifying audio data. Efforts expended by a user in identifying audio data may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 12:
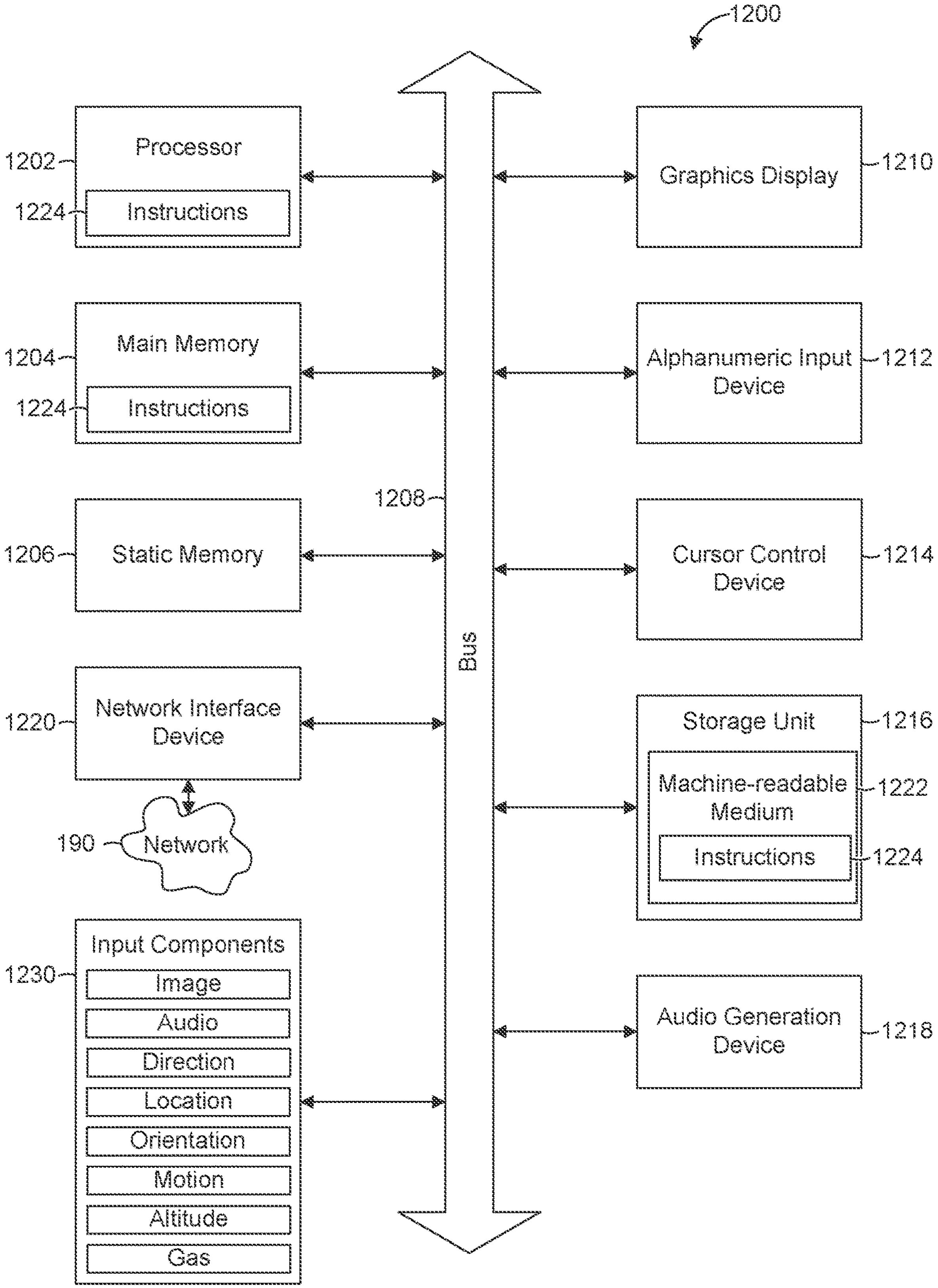
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a machine-readable storage medium, a computer-readable storage medium, or any suitable combination thereof) and perform any one or more of the methodologies discussed herein, in whole or in part. Specifically, FIG. 12 shows the machine 1200 in the example form of a computer system within which the instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An apparatus comprising:

a vector generator to:

determine first and second groups of frequencies in a plurality of frequencies from spectral data derived from audio data, the first group including frequencies different from frequencies in the second group of frequencies, each of the frequencies of the first group being higher than each of the frequencies in the second group, identify a first subgroup of frequencies in the first group of frequencies based on energy values of the first group, each of the frequencies of the first subgroup having energy values that are greater than energy values of other frequencies in the first group, identify a second subgroup of frequencies in the second group of frequencies based on energy values of the second group, each of the frequencies of the second subgroup having energy values that are greater than energy values of other frequencies in the second group, and generate a vector that assigns a first value to the frequencies in the first subgroup and assigns a second value to the frequencies in the second subgroup;

a scrambler to generate permutations of the vector, the permutations differently arranging instances of the first and second values;

a coder to generate a sequence that indicates an instance of the first value or of the second value within a corresponding permutation of the permutations; and a fingerprint generator to generate a fingerprint of the audio data based on the sequence, wherein the generation and decoding of the fingerprint is to conserve computing resources.

2. The apparatus as defined in claim 1, wherein the first and second values are equal to a shared common value, the vector to assign the shared common value to frequencies in the first and second subgroups of frequencies.

3. The apparatus as defined in claim 1, wherein frequencies in the spectral data include a different ordinal position within the spectral data, and the vector generator is to define weighting ones of the respective energy values based on an ordinal position of its corresponding frequency in the spectral data.

4. The apparatus as defined in claim 3, wherein the vector generator is to weight ones of the respective energy values includes multiplying ones of the respective energy values by a corresponding weight factor that indicates the ordinal position of its corresponding frequency in the spectral data.

5. The apparatus as defined in claim 1, wherein the vector generator is to:

identify the first subgroup of frequencies based on ranked energy values of the first group of frequencies; and identify the second subgroup of frequencies based on ranked energy values of the second group of frequencies.

6. The apparatus as defined in claim 1, wherein the coder is to generate the sequence by generating an ordered plurality of permutations that differently arrange the vector.

7. The apparatus as defined in claim 1, wherein the coder is to generate the sequences by generating numbers based on calculating a remainder from a modulo operation performed on a numerical representation of a lowest relative position occupied by any instance of the first or second values in the corresponding permutation.

8. The apparatus as defined in claim 1, wherein the fingerprint generator is to generate the fingerprint by storing the sequence with a timestamp that indicates the audio data being fingerprinted.

9. A method comprising:

determining, by executing an instruction with at least one processor, first and second groups of frequencies in a plurality of frequencies from spectral data derived from audio data, each of the first group including frequencies higher than frequencies of each of the second group of frequencies;

identifying, by executing an instruction with the at least one processor, a first subgroup of frequencies in the first group of frequencies based on energy values of the first group, each of the first subgroup including frequencies with energy values that are greater than energy values of other frequencies in the first group;

identifying, by executing an instruction with the at least one processor, a second subgroup of frequencies in the second group of frequencies based on energy values of the second group, each of the second subgroup including frequencies with energy values that are greater than energy values of other frequencies in the second group;

creating, by executing an instruction with the at least one processor, a vector that assigns a first value to frequencies in the first subgroup and assigns a second value to frequencies in the second subgroup;

generating, by executing an instruction with the at least one processor, permutations of the vector, the permutations differently arranging instances of the first and second values;

generating, by executing an instruction with the at least one processor, a sequence that indicates an instance of the first value or of the second value within a corresponding permutation of the permutations; and generating, by executing an instruction with the at least one processor, a fingerprint of the audio data based on the sequence, wherein the generation and decoding of the fingerprint is to conserve computing resources.

10. The method as defined in claim 9, wherein the identifying of the first subgroup of frequencies is based on ranked energy values for the first group of frequencies, and wherein the identifying of the second subgroup of frequencies is based on ranked energy values for the second group of frequencies.

11. The method as defined in claim 9, wherein the generating of the sequence includes generating numbers by calculating a remainder from a modulo operation performed on a numerical representation of a lowest relative position occupied by any instance of the first or second values in the corresponding permutation.

12. The method as defined in claim 9, wherein the generating of the fingerprint of the audio data includes storing the sequence with a timestamp that indicates the audio data being fingerprinted.

13. The method as defined in claim 9, wherein the generating of the fingerprint of the audio data includes storing ones of multiple portions of the sequence in a different corresponding hash table among multiple hash tables that correspond to a timestamp that indicates the audio data being fingerprinted.

14. A method comprising:

generating, by executing an instruction with at least one processor, a candidate fingerprint of a candidate audio file by:

determining a first group of frequencies and a second group of frequencies in a plurality of frequencies of spectral data of the candidate audio file, each of the first group including frequencies higher than frequencies of each of the second group, in the first group of frequencies, identifying a first subgroup of frequencies based on energy values of the first group of frequencies, each of the first subgroup including frequencies with energy values that are greater than energy values of other frequencies in the first group, in the second group of frequencies, identifying a second subgroup of frequencies based on energy values of the second group, each of the second subgroup including frequencies with energy values that are greater than energy values of other frequencies in the second group, creating a vector that assigns (a) a first value to frequencies in the first subgroup and (b) a second value to frequencies in the second subgroup, generating permutations of the vector, the permutations differently arranging instances of the first and second values, generating a sequence that indicates an instance of the first value or of the second value within a corresponding permutation of the permutations, and generating the fingerprint based on the sequence; and comparing, by executing an instruction with the at least one processor, the candidate fingerprint to a reference audio data segment fingerprint.

15. An apparatus comprising:

means for identifying first and second groups of frequencies of spectral data derived from audio data, each of the first group having frequencies that are higher than frequencies of each of the second group;

means for identifying first and second subgroups of the first and second groups, respectively, each of the first subgroup including frequencies with energy values that are greater than energy values of other frequencies in the first group, and each of the second subgroup including frequencies with energy values that are greater than energy values of other frequencies in the second group;

means for generating a vector to assign a first value to frequencies of the first group and a second value to frequencies in the second subgroup;

means for generating permutations of the vector; and means for generating a sequence that indicates an instance of the first value or the second value within a corresponding permutation of the permutations to generate a fingerprint of the audio data based on the sequence.

16. The apparatus as defined in claim 15, further including means for comparing the fingerprint to candidate audio.

17. The apparatus as defined in claim 16, further including means for generating a fingerprint of the candidate audio.

18. The apparatus as defined in claim 15, further including means for weighting energy values of the spectral data.

19. The apparatus as defined in claim 15, wherein the means for generating the sequence includes means for ordering the permutations.

20. A non-transitory machine readable medium comprising instructions, which when executed, cause a processor to at least:

determine first and second groups of frequencies in a plurality of frequencies from spectral data derived from audio data, the first group including frequencies different from frequencies in the second group of frequencies, each of the first group having frequencies that are higher than frequencies of each of the second group;

identify a first subgroup of frequencies in the first group of frequencies based on energy values of the first group, each of the first subgroup including frequencies with energy values that are greater than energy values of other frequencies in the first group;

identify a second subgroup of frequencies in the second group of frequencies based on energy values of the second group, each of the second subgroup including frequencies with energy values that are greater than energy values of other frequencies in the second group;

create a vector that assigns a first value to frequencies in the first subgroup and assigns a second value to frequencies in the second subgroup;

generate permutations of the vector, the permutations differently arranging instances of the first and second values;

generate a sequence that indicates an instance of the first value or of the second value within a corresponding permutation of the permutations; and generate a fingerprint of the audio data based on the sequence.

21. The non-transitory machine readable medium as defined in claim 20, wherein the first subgroup of frequencies is identified based on ranked energy values for the first group of frequencies, and the identifying of the second subgroup of frequencies is identified based on ranked energy values for the second group of frequencies.

22. The non-transitory machine readable medium as defined in claim 20, wherein the sequence is generated by generating numbers based on calculating a remainder from a modulo operation performed on a numerical representation of a lowest relative position occupied by any instance of the first or second values in the corresponding permutation.

23. The non-transitory machine readable medium as defined in claim 20, wherein the fingerprint is generated by storing ones of multiple portions of the sequence in a different corresponding hash table among multiple hash tables that correspond to a timestamp that indicates the audio data being fingerprinted.

* * * * *